United States Patent [19]
Cherry

[11] Patent Number: 5,949,212
[45] Date of Patent: Sep. 7, 1999

[54] INTEGRATED SOLAR CELL ARRAY AND POWER REGULATOR

[75] Inventor: Raymond L. Cherry, Auburn, Wash.

[73] Assignee: The Boeing Company, Seattle, Wash.

[21] Appl. No.: 08/869,365

[22] Filed: Jun. 5, 1997

[51] Int. Cl.[6] .................................................. H02J 7/00
[52] U.S. Cl. ........................................................... 320/101
[58] Field of Search ........................... 320/101; 136/291; 323/906; 307/46, 64, 66

[56] References Cited

U.S. PATENT DOCUMENTS

| | | |
|---|---|---|
| 3,600,599 | 8/1971 | Wright et al. . |
| 3,997,830 | 12/1976 | Newell et al. ............................ 320/101 |
| 4,306,183 | 12/1981 | Wright . |
| 4,327,318 | 4/1982 | Kwon et al. . |
| 4,691,159 | 9/1987 | Ahrens et al. . |
| 4,706,010 | 11/1987 | Callen et al. . |
| 4,812,737 | 3/1989 | Fleck . |
| 5,025,202 | 6/1991 | Ishii et al. ................................ 320/101 |
| 5,229,708 | 7/1993 | Donig et al. . |
| 5,608,385 | 3/1997 | Masaki ..................................... 320/101 |
| 5,648,731 | 7/1997 | Decker et al. ........................... 324/767 |
| 5,703,468 | 12/1997 | Petrillo ..................................... 320/101 |
| 5,714,869 | 2/1998 | Tamechika et al. ..................... 320/101 |

*Primary Examiner*—Peter S. Wong
*Assistant Examiner*—K. Shin
*Attorney, Agent, or Firm*—Christensen O'Connor Johnson & Kindness PLLC

[57] ABSTRACT

A power regulator circuit efficiently regulates electrical power generated by a solar cell array for satellite system load requirements and rechargeable battery needs. The power regulator circuits mounted opposite the solar panel regulate the power generated by the solar array according to a voltage signal generated by a processor. The regulator circuit includes a linear circuit for generating an output signal according to the generated voltage signal; and a resistor strip for dissipating the solar array generated power according to the generated output signal.

14 Claims, 4 Drawing Sheets

INTEGRATED SOLAR CELL ARRAY AND POWER REGULATOR

FIELD OF THE INVENTION

This invention relates to a power regulator for a solar cell array, and, more particularly, for a satellite solar cell array.

BACKGROUND OF THE INVENTION

Solar cell arrays are provided on satellites to charge batteries which, in turn, provide power to the electrical components of the satellite. Power regulators are required for optimum battery charging and maintenance. For example, some satellites have orbits in which the satellite is out of view of the sun periodically. When the sun comes back in view, the cold solar cell arrays are highly efficient and provide very high power output. Without power regulators, the high power output of a solar cell array could overdrive the batteries or create excessive voltages.

Various methods are used to provide regulation for solar cell array generated power. Current techniques, such as cell string switching and switching regulatory architectures, require switching of transistors at high speeds, typically between 100–1000 times per second. The noise and accompanying transients produced by the switching transistors must be filtered to meet EMI requirements. In order to meet these requirements, extra circuitry and structural components are necessary, thereby adding weight to the satellite. Generally, these regulators require a lot of heavy wiring (typically copper) to implement the voltage regulation. Also, weight is added from other structural components that are necessary for protecting standard electronic hardware from the environments of orbit, such as large temperature changes (+125° C. to −140° C.), numerous temperature cycles (3,000 to 30,000 earth orbits), and high radiation (4 megarad). The waste heat of a switching regulator is normally conducted away by a thermal control pallet, which typically weighs 10 pounds for every 1000 watts handled by the regulator.

The previous systems perform a discrete shunt, thereby causing the solar array to remain hot during an off shunt. Heat build-up degrades the solar array performance and efficiency over time. Also, these systems are custom designed to support the solar array they are to function with. If the power requirements and the solar array are changed, the regulator must be redesigned, with an obvious increase in cost.

SUMMARY OF THE INVENTION

The present invention provides a method and apparatus capable of smoothly regulating solar cell array power with modular features at a great decrease in weight and cost. The power regulating system includes a solar panel having a solar cell array mounted on a first side of the solar panel for generating electrical power, and a processor for generating a signal varying according to satellite system load requirements and rechargeable battery needs. The system also includes a regulator circuit mounted on a second side of the solar panel and electrically coupled to the solar cell array for regulating the power generated by the solar cell array according to the processor signal and supplying the regulated power to satellite systems and rechargeable batteries. The regulator circuit includes a linear circuit for generating an output signal according to the processor signal and a resistor strip for dissipating the solar cell array generated power according to the output signal, thereby regulating the power generated by the solar array.

In accordance with other aspects of this invention, the processor further includes a rechargeable battery current sensor for determining the charging current of the rechargeable batteries.

In accordance with further aspects of this invention, the linear circuit is implemented in silicon dye and mounted on a support substrate.

In accordance with further aspects of this invention, the staging circuit includes stages of operation, according to generated voltage signals, and the resistor strip includes multiple resistive paths, each resistive path corresponding to a separate stage of operation. The stages of operation and corresponding resistive paths shunt predetermined levels of solar array generated power.

In accordance with further aspects of this invention, the resistor strip includes at least one circuit trace. The shape and resistive value of the circuit trace are determined according to solar cell array size and power output and operating voltage of the satellite systems. The resistor strip is a flexible circuit laminate.

In accordance with further aspects of this invention, the power regulating system further includes a control bus for supplying generated voltage signals to the regulator and supplying a rechargeable battery charging current signal to the processor, wherein a portion of the control bus is a flexible circuit laminate mounted to the second side of the solar panel. The power regulating system also includes a power distribution bus for distributing the regulated power to the satellite systems and rechargeable batteries, wherein a portion of the power distribution bus is a flexible circuit laminate mounted to the second side of the solar panel.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
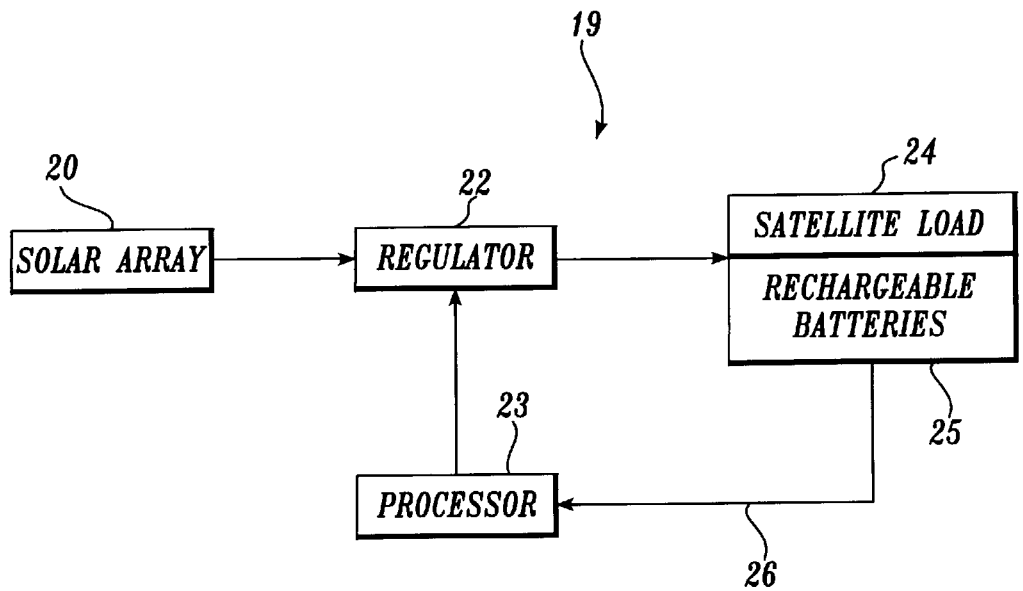
FIG. 1 is a block diagram of a solar cell array and power regulator for battery recharging according to the present invention.

A solar cell array power regulating system in accordance with the present invention supports battery charging and, hence, electrical power requirements of a spacecraft. More specifically, with reference to FIG. 1, such a solar cell array power regulating system 19 includes solar cell arrays 20, a regulator unit 22 receiving the output of the arrays, a processor 23 supplying a control signal to the regulator unit 22, and satellite components (load) 24 and rechargeable batteries 25 for receiving the output of the regulator unit 22 via a power distribution bus. In addition, as represented by line 26 in FIG. 1, the power requirements of the load 24 and batteries 25 are monitored and used by the processor 23 to adjust its control signal to the regulator unit 22.

The regulator unit 22 reacts nearly instantaneously to satellite load and rechargeable battery requirements, thereby maintaining the voltage level of the power distribution bus within the satellite. The regulator unit 22 dumps power from the solar cell arrays 20 according to a processor,determined voltage input signal, thereby acting as a voltage to current converter. If the processor 23 senses the batteries need a larger charging current or the satellite load increases, the regulator unit 22 shunts less output of the solar cell arrays 20. In the other situation, if the batteries need just a trickle charge or satellite load decreases, the regulator unit 22 shunts an amount of output from the solar cell array 20 sufficient to maintain the power distribution bus voltage and power requirements.

Figure 2:
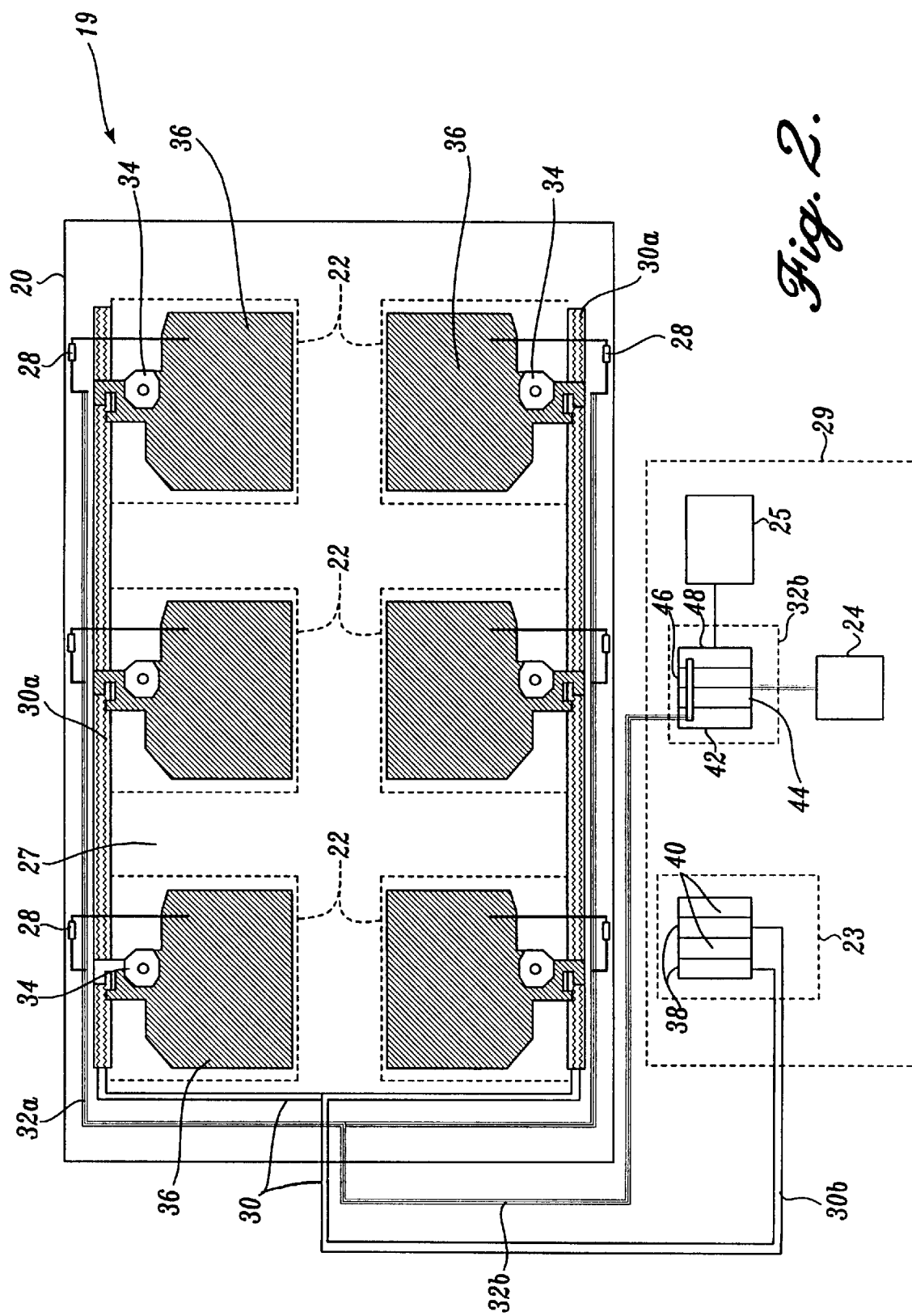
FIG. 2 is a more detailed schematic diagram of the solar cell array and power regulator for battery recharging of FIG. 1.

FIG. 2 illustrates in more detail components of the solar array power regulating system 19. A solar panel 27 includes one or more solar cell arrays 20, the regulator unit(s) 22, a first portion of a control bus 30 for allowing communication between the regulator unit(s) 22 and the processor 23 and a first portion of a power distribution bus 32a for conducting power generated by the solar cell arrays 20 off the solar panel 27. Locating the regulator unit(s) 22 on the solar panel provides an easily maintainable solar panel modular unit. This modular unit may be easily added to an orbiting satellite to compensate for extra system load requirements or removed and replaced if faulty. Each regulator unit 22 includes a regulator module 34 and a resistor strip 36 connected to the regulator module 34. Blocking diodes 28 are connected between the resistor strips 36 and power distribution bus 32a to limit satellite system power loss in the event of regulator circuit failure.

Rechargeable batteries 25, the processor 23, satellite load 24 and the second portions of the control bus 30b and the power distribution bus 32b are located on the body of the satellite. Buses 30b and 32b provide connection to the buses 30a and 32a on the solar panel 27. The processor 23 includes at least one control module 38 and may include redundant control and monitor modules 38 and 40. The second portion of the power distribution bus 32b includes fuse modules 42 and 44, capacitor module 46, and a battery interface module 48.

The solar cell array 20 is mounted module on a first side (front side) of the solar panel 27 for exposure to the sun. The regulator module(s) 34, the resistor strip(s) 36, the power distribution bus 32a, the control bus 30a and blocking diodes 28 are mounted on the panel side remote from the sun (the second or backside of the panel). The circuit design and materials of the components of the power regulating system 19 mounted on or incorporated in the backside of the solar panel 27 provide a great decrease in weight over conventional solar cell array power regulating systems. The solar panel 27 with attached components include components for allowing easy connect or disconnect with a satellite main body. Therefore, a change of the power requirements of a satellite is virtually nonintrusive, thereby reducing cost significantly when changing solar array power capabilities.

The regulator module 34 and the resistor strip 36 are bonded to the rear surface of the solar panel 27 with an adhesive substance capable of withstanding the dynamics experienced in an earth orbit or in outer spaces The regulator module 34 may be bonded first to the resistor strip 36 or directly to the solar panel 27. Preferably, a flexible silicon adhesive bonds the regulator module 34 to the resistor strip 36 or the solar panel 27, thereby allowing easy regulator module replacement, if required. The resistor strip 36 bonds to the solar panel 27 with a film adhesive. The solar panel 27 may be a rigid substrate, such as graphite-epoxy or aluminum face sheet and a honeycomb aluminum core, or may be a flexible substrate, such as a polyimide film like Kapton®.

The solar cell array 20 resides on the front surface of the solar panel 27. In addition or as an alternative to planar photovoltaic cells, the array can use optical solar reflectors, flexible optical solar reflectors and lenses, or any other suitable solar powered, voltage generating components.

Figure 3:
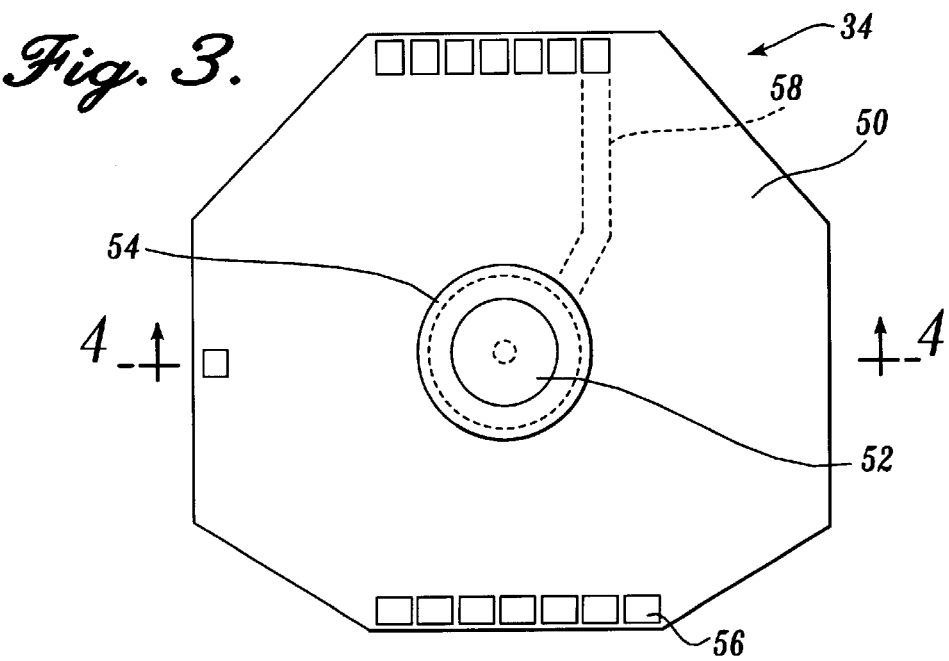
FIG. 3 is a somewhat diagrammatic top plan of a solar cell array regulator according to the present invention.
Figure 4:
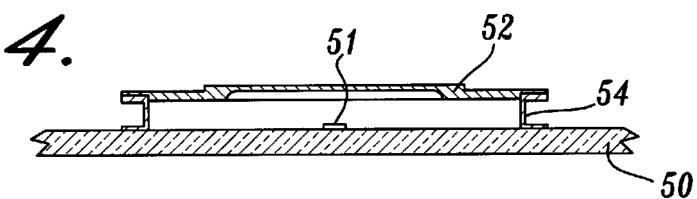
FIG. 4 is a transverse vertical section along line 4—4 of FIG. 3.

In the embodiment shown in FIGS. 3 and 4, the regulator module 34 is composed of a package substrate 50, a regulator circuit 51 mounted on the substrate, a seal ring 54 encircling the regulator circuit 51, a lid 52 covering the regulator circuit 51 having its peripheral margin sealed to the seal ring, contact pads 56 located outside the seal ring 54, and circuit pad connections 58 extending between the regulator circuit 51 and the contact pads 56.

The package substrate 50 has a thermal conductivity similar to aluminum and a thermal expansion coefficient similar to silicon. The package substrate 50 is preferably made from co-fired aluminum nitride so that the substrate is thermally conductive. The desired level of package substrate thermal conductivity allows the package substrate 50 to function as a thermal radiator and heat sink. The thermal expansion coefficient of the package substrate 50 minimizes thermally induced stress at a bond line between the package substrate 50 and the regulator circuit 51.

Preferably, regulator circuit 51 is implemented in silicon dye, thereby requiring no conductors or large capacitor values, described in more detail below. Essentially, the circuit is static in nature, producing none of the electromagnetic interference (EMI) normally associated with switching architectures. All the component dye of the regulator circuit 51 is silicon and is bonded to the package substrate 50 with a gold/silicon eutectic bond, The eutectic bond provides an extremely strong bond which can withstand the severe thermal cycling environment of certain satellite orbits.

In the preferred embodiment, the contact pads 56 are electrically connected to the resistor strip 36 (FIG. 2) with a welded, flexible gold ribbon. Preferably, the lid 52 and seal ring 54 are composed of a material such as Kovar®, with thermal expansion characteristics similar to the package substrate 50. The lid 52 and seal ring 54 are round, for minimizing thermal stress concentrations. As shown in FIG. 4, the lid's cross section appears like a hat with a raised central portion, which provides a resonance frequency above 2000 Hz for withstanding the dynamics of an earth launch. This hat-type cross section stiffens the lid, thereby allowing the regulator module 34 to withstand the high acoustic environment during solar panel acceptance testing and launch. The seal ring's cross section is C-shaped to minimize thermal stresses by presenting a flexible structural member between the package substrate 50 and the lid 52.

Figure 5:
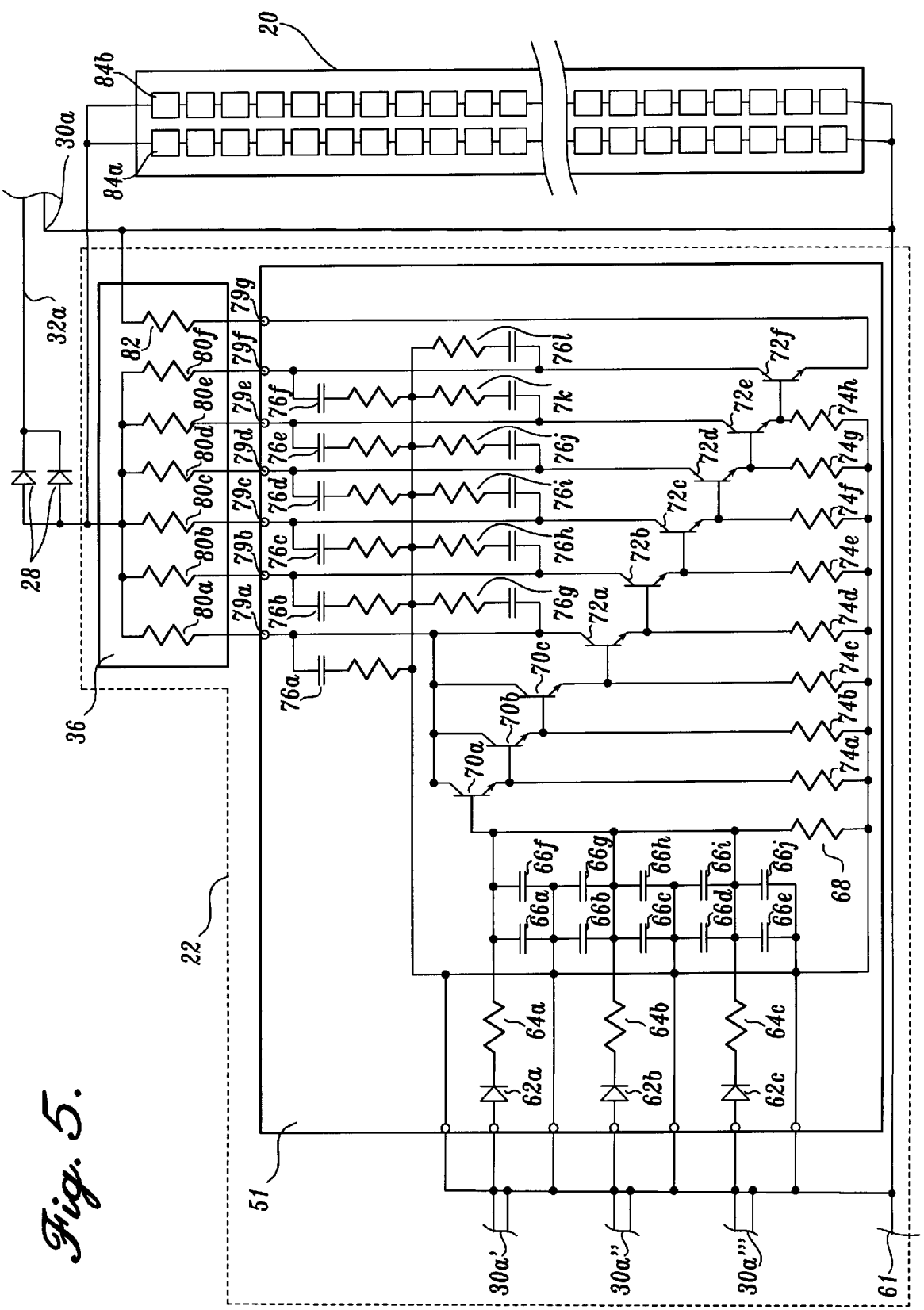
FIG. 5 is a circuit diagram of the components of the solar cell array power regulating system as mounted on a solar panel.

FIG. 5 illustrates a circuit diagram of the preferred embodiment of the regulator unit 22. Modularized components include the regulator module 34 (FIG. 3) with a regulator circuit 51 and a resistor strip 36, a set of solar cell strips 84a and 84b in a solar cell array 20 and blocking diodes 28 with inputs coupled to a first output of the resistor strip 36 and an output of the solar cell arrays 20. The resistor strip circuit 36 includes multiple resistive strips and is coupled to receive the regulator circuit output. In the example shown in FIG. 5, the solar arrays 20 include a plurality of solar cell strips 84a and 84b which, along with the blocking diodes 28, are standard components of a solar cell array system.

The regulator circuit 51 and resistor strip 36 form a six-stage linear shunt regulator. Preferably, the resistor strip 36 is a flexible circuit laminate including a layer of polyimide film such as Kapton, Teflon®, etched Inconel foil, another layer of Teflon, and a final polyimide film layer. In the embodiment shown in FIG. 5, each resistor strip 36 includes seven resistor circuit traces 80a–f and 82. The circuit traces are in a zigzag pattern, which minimizes circuit inductance and allows for thermal expansion of the Inconel foil. Minimum bend-radius requirements for the zigzag pattern are determined according to circuit trace size and are required to prevent excessive thermal stress concentrations, which cause cracking. As will be readily appreciated by those of ordinary skill in the circuit design art, the shape and resistor values for the resistor strip 36 are adjustable according to the specific solar array dimensions, solar array power output, and system operating voltage. The operating temperatures of the regulator circuit 51 and the resistor strip 36 are therefore adjustable for a given solar array design. If the solar array includes multiple cell strings, the resistor strip 36 is,designed to distribute the power evenly among the solar cell strings. Designing resistor strips to function with specific solar cell strings prevents excessive drop in voltage capability in a solar cell array, which would occur if that particular string were heated more than the other cell strings.

Still referring to FIG. 5, the preferred circuit design is a six-stage linear shunt regulator implemented in a light weight regulator mounted on the back side of a solar panel. Since the regulator of the present invention is implemented as a light weight component mounted on the back of the solar panel, the circuit of the preferred embodiment of the present invention does not include high speed switching transistors that require heavy support structures for decreasing EMI and protecting the circuit components. The preferred circuit design of FIG. 5 exhibits robust characteristics in physically dynamic earth orbits.

As shown in FIG. 5, the regulator circuit 51 is controlled by three control buses 30a'–a''', thereby providing triple redundancy. It can be appreciated by one of ordinary skill in the art that this circuit may be controlled by a single control bus. The amount of current shunted is determined by the highest voltage level of the control buses 30a'–a'''.

The control buses 30a'–a''' connect to the input of isolation diodes 62a–c, respectively. The outputs of isolation diodes 62a–c connect to the base of a first predriver, NPN transistor 70a through isolation resistors 64a–c, respectively. The base of predriver transistor 70a connects to a ground line 61 through filter capacitors 66a–j, and a bleed resistor 68, all of which are connected in parallel. The emitters of transistors 70a and b connect to the base of predriver transistor 70b and c, respectively. The emitters of predriver transistors 70a–c connect to ground through bleed resistors 74a–c, respectively. The collectors of the predriver transistors 70a–c are also connected to output 79a of regulator circuit 51. The emitter of predriver transistor 70c connects to the base of power NPN transistor 72a. The collectors of power transistors 72a–f connect to regulator circuit outputs 79a–f, respectively. Each emitter of the power transistors 72a–e connects to the bases of power transistors b–f, respectively. The emitters of power transistors 72a–e also connect to the ground line 61 through bleed resistors 74d–h, respectively. The emitter of power transistor 72f connects to regulator circuit output 79g. The predriver transistors 70a–c and power transistors 72a–f are in a "Darlington" configuration, thus forming an intrinsically staging emitter-follower circuit.

The collectors of predriver transistors 70a–c and the collectors of power transistors 72a–f connect to the ground line 61 through filters 76a–l. Each transistor collector connects to the ground line 61 through two sets of capacitor/resistor pairs for redundancy.

In this example, the solar cell arrays 20 include two solar cell strips 84a, b. One end of the solar strips is connected to the input of blocking diodes 28. The other end of the solar cell strips 84a and b are connected to the ground line 61. Regulator circuit outputs 79a–f also connect to the blocking diodes' inputs through resistors 80a–f, respectively. The outputs of blocking diodes 28 connect to the power distribution bus 32a. Regulator circuit output 79g connects to the ground line 61 through resistor 82 within resistor strip 36.

The isolation diodes 62a–c prevent reverse current flow from occurring at the regulator circuit input. The isolation resistors 64a–c limit input current and form a single pole input filter with capacitors 66a–j and resistor 68. The amount of current shunted is determined by the highest voltage level of the control bus inputs. Once a control bus voltage is sufficient to turn on transistors 70a–c and 72a–f, the amount of shunted current is proportional to that input voltage. The emitter resistor 82 in the resistor strip 36 acts as a current sensor and feedback mechanism. Intrinsic staging occurs due to transistor current gain of each transistor stage. The power transistor 72f is the first to turn on and transitions through a linear region to saturation. The other power transistors at this point need only provide bias and dissipate small amounts of power. As each power transistor successively saturates, the transistor connected to its base will enter the linear region. Therefore, when only one transistor is linear in the circuit and the others are either saturated or off, the power in the regulator will be greatly reduced. The circuit still functions as a linear device. The predriver transistors 70a–c provide current gain at very low temperatures (–160° C.) and high radiation levels (4 megarad). Under these extreme conditions, transistor current gain can drop below 10. According to one embodiment, this configuration functions with predriver transistor gains as low as 3 and power transistor gains as low as 1. The bleed resistors 74a–h drain off transistor leakage current which would otherwise turn on an adjacent transistor.

The filters 76a–l prevent oscillation by compensating for parasitic inductance in the transistor collector circuit thus maintaining the linear qualities of the regulator circuit 51. Another common name for these types of filters is inductance or Q killers, because they make the resistor strip 36 always look like a resistor by nullifying any subtle oscillations.

Figure 6:
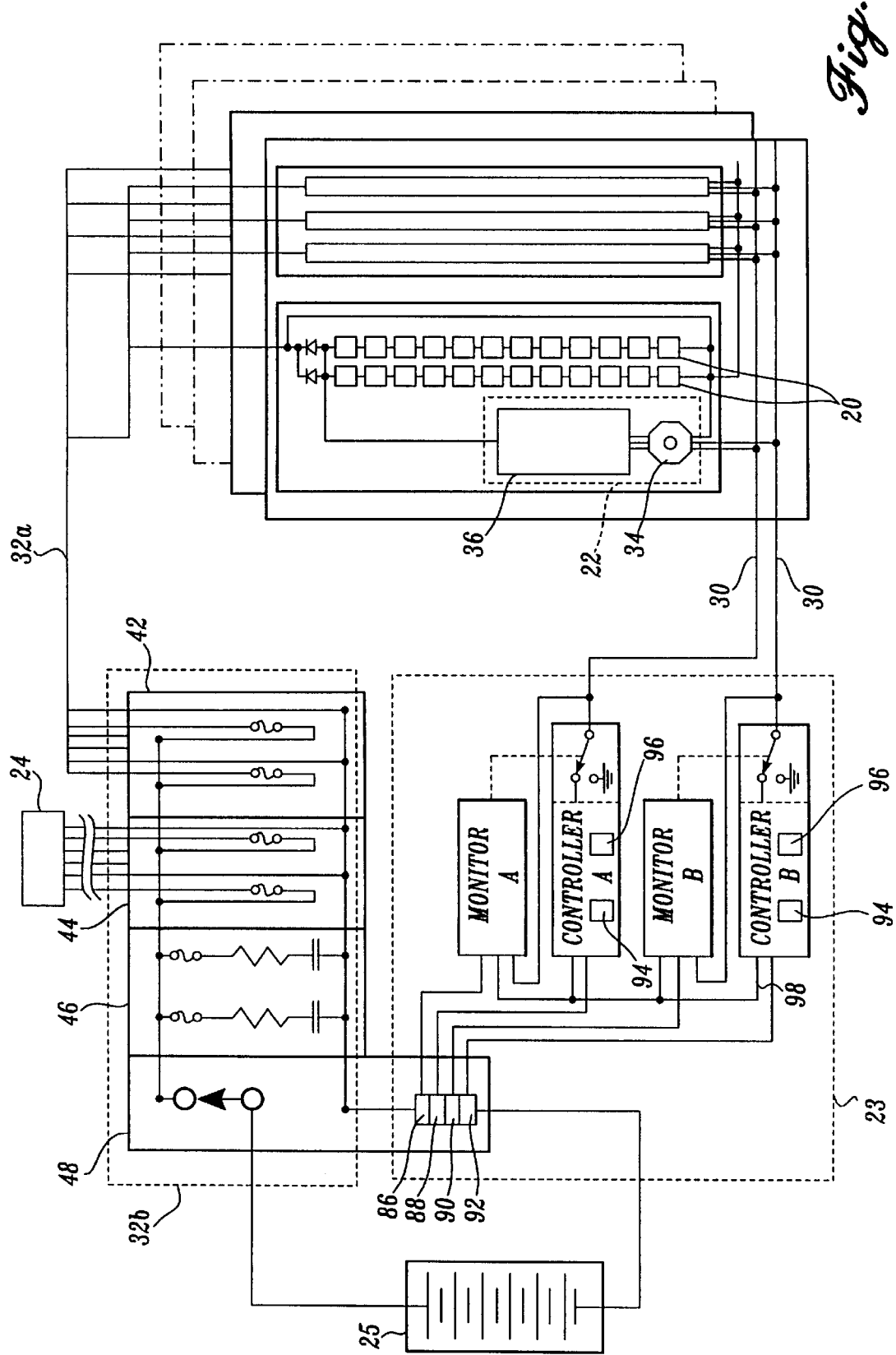
FIG. 6 is a circuit diagram of the solar cell array power regulating system of the present invention.

FIG. 6 illustrates a representative integrated solar array regulator system according to the present invention. This solar array regulator system is implemented with two identical Controllers A and B and their associated monitor circuits, Monitors A and B. Each controller implements a battery charge current control loop using a second order (integrating) loop filter. The Controllers A and B provide current drive outputs into the control bus 30. This allows the regulators 22 and the solar cell array 20 to be added or deleted as a unit without changing loop gain within the controllers as current sharing among the inputs results in the same combined current gain. Adding or deleting regulator circuits, resistor strips, and solar array combinations changes the dynamic range, not the current gain. Therefore, the processing circuitry within the spacecraft need not be changed.

Resistive shunt current transducers 86, 88, 90 and 92 measure battery charge current to and from the power distribution bus 32a. In the preferred embodiment, the current transducers 86, 88, 90 and 92 include a single resistive element with independent electronic interfaces. The controllers set the voltage level for the regulator inputs according to the measured battery charge current, battery load and satellite load requirements as determined by a satellite processor.

A typical power distribution configuration is illustrated in FIG. 6. Here, the distribution system consists of a battery interface module 48, a capacitor module 46, and two fuse modules 42 and 44. The capacitor module 46 contains capacitors with series resistors and fuses. The capacitor module 46 counteracts the effects of battery inductance producing a low, consistent bus impedance over a wide frequency range. The fuse module 44 provides protected connections to the satellite loads 24. The fuse module 42 provides protected power connections to the regulator unit 22.

In this example, Controller A is set to a charge current slightly less than Controller B. This results in Controller B's output drive going to zero current (and volts) as Controller A will hold the charge current to a value lower than Controller B's set point. If Controller A faults to a state that allows too high a charge rate (above that of Controller B's set point), Controller B will come out of saturation and maintain Controller B's charge rate. If Controller A faults to a state that results in too low a charge rate, monitor A will switch (via a relay in Controller A's output) Controller A off. Controller B then assumes control.

Monitor A detects Controller A's status by monitoring the power distribution bus voltage, battery charge current (via transducer 86), and Controller A's output voltage. If the power distribution bus voltage is not above a predefined overvoltage set point, the battery charge current is too low, and Controller A's output voltage is significantly positive (output drive not "OFF"), the monitor considers Controller A to be in a fault condition. The controller should not be trying to shunt current when the battery does not have sufficient charge current unless an overvoltage condition exists. The monitor integrates the fault condition to avoid false trips on transient conditions. The integration is weighted to allow detection of oscillatory conditions. The integration is implemented as an integrator which acts as a counter. The integrator increments twice per time period when a fault condition is detected and decrements once per time period when no fault condition exists (note: minimum count is zero). A controller oscillating with a fifty percent duty cycle (fault versus no fault condition) is disabled by the respective monitor when the increasing count reaches a predefined "trip count." Note that the turn-on threshold (always greater than 3 volts) makes it easy for the monitor to detect whether a controller is shunting current. Monitor B performs the same function for Controller B. This redundant architecture provides satellite operation through a single point fault with autonomous recovery.

The controllers and monitors each contain two programmable charge rate (current set point) registers 94 and 96. The first register 94 contains the high charge rate value, and the other register 96 contains the low rate (trickle charge) value. According to the preferred embodiment of the present invention, the selection of the registers 94 and 96 is implemented in hardware according to sensing of the rechargeable battery needs. A common voting bus 98 is used to select high or low rate in the controllers and monitors by majority vote (2 of 3) (one of the four (Controllers and Monitors A and B) is not used). Each controller and monitor is capable of generating a single vote from a programmable single bit register. By using a voting bus, the charge rate can be changed at slow speeds (minutes) by the spacecraft computer(s). All the controllers and monitors change rate at the same time the majority vote changes. Transmission of charge values (which could be corrupted) is not required for normal operation (only for setup). This configuration simplifies computer implementation of battery charge termination algorithms by allowing a three computer vote, a two computer compare and self check, and a single computer internal compare and self check architectures. Each controller and monitor loads its respective charge registers at "power on" from internal non-volatile memory and the output vote defaults to a high rate. This provides immediate charge control and gives time for the computers to boot-up on power-up. This simplifies ground testing as the system does not require downloading or special set-up commands on power-up. Autonomous starting from a dead battery on orbit (Dead Start) is also simplified.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A power regulating system for generating regulated power for satellite systems and rechargeable batteries; the power regulating system comprising:
   a solar panel;
   a solar array mounted on a first side of the solar panel for generating electrical power;
   a control circuit for determining satellite system load requirements and rechargeable battery needs and generating a voltage signal according to the determined satellite system load requirements and rechargeable battery needs; and
   a regulator circuit mounted on a second side of the solar panel and electrically coupled to the solar array for regulating the power generated by the solar array according to the generated voltage signal and supplying the regulated power to satellite systems and rechargeable batteries, the regulator circuit further comprising:
   a staging circuit for converting the generated voltage signal into a current signal; and
   a resistor strip for dissipating the solar array generated power according to the generated current signal, thereby regulating the power generated by the solar array.

2. The power regulating system of claim 1, wherein the control circuit further comprises a rechargeable battery current sensor for determining the charging current of the rechargeable batteries.

3. The power regulating system of claim 1, wherein the regulator circuit is implemented in silicon dye and mounted on a support substrate.

4. The power regulating system of claim 1, wherein the staging circuit comprises stages of operation according to generated voltage signals and the resistor strip comprises multiple resistive paths, each resistive path corresponding to a separate stage of operation.

5. The power regulating system of claim 4, wherein the stages of operation and corresponding resistive paths shunt predetermined levels of solar array generated power.

6. The power regulating system of claim 1, wherein the solar panel is a rigid substrate.

7. The power regulating system of claim 1, wherein the solar panel is a flexible substance.

8. The power regulating system of claim 7, wherein the flexible substance is a polyimide film.

9. The power regulating system of claim 1, wherein the resistor strip comprises at least one circuit trace.

10. The power regulating system of claim 9, wherein the shape and resistive value of the at least one circuit trace are determined according to solar array size and power output and operating voltage of the satellite systems.

11. The power regulating system of claim 1, wherein the resistor strip is a flexible circuit laminate.

12. The power regulating system of claim 1, further comprising:

a control bus for supplying generated voltage signals to the regulator and supplying a rechargeable battery charging current signal to the control circuit, wherein a portion of the control bus being a flexible circuit laminate mounted to the second side of the solar panel; and a power distribution bus for distributing the regulated power to the satellite systems and rechargeable batteries, wherein portion of the power distribution bus being a flexible circuit laminate mounted to the second side of the solar panel.

13. The power regulating system of claim 1, wherein the regulator is an easily replaceable modular component of the power regulating system.

14. The power regulating system of claim 1, wherein the solar panel with solar array and regulator circuit comprises connecting means for allowing connection and disconnection of the solar panel to the satellite for design upgrade.

* * * * *